United States Patent
Fargier et al.

(10) Patent No.: US 9,415,327 B2
(45) Date of Patent: Aug. 16, 2016

(54) DEVICE FOR COLLECTING AND SEPARATING AQUEOUS AND/OR OILY LIQUIDS AND CRYOGENIC LIQUID

(71) Applicants: Cyrille Fargier, Versailles (FR); Philippe Montrocher, Versailles (FR)

(72) Inventors: Cyrille Fargier, Versailles (FR); Philippe Montrocher, Versailles (FR)

(73) Assignee: Saipem S.A., Montigny le Bretonneux (FR)

( * ) Notice: Subject to any disclaimer, the term of this patent is extended or adjusted under 35 U.S.C. 154(b) by 176 days.

(21) Appl. No.: 14/352,901

(22) PCT Filed: Oct. 1, 2012

(86) PCT No.: PCT/FR2012/052220
§ 371 (c)(1),
(2) Date: Apr. 18, 2014

(87) PCT Pub. No.: WO2013/057405
PCT Pub. Date: Apr. 25, 2013

(65) Prior Publication Data
US 2014/0263052 A1    Sep. 18, 2014

(30) Foreign Application Priority Data

Oct. 20, 2011    (FR) ...................................... 11 59486

(51) Int. Cl.
*C02F 1/22* (2006.01)
*C02F 1/26* (2006.01)
(Continued)

(52) U.S. Cl.
CPC ................ *B01D 12/00* (2013.01); *B01D 17/02* (2013.01); *B01D 17/0211* (2013.01);
(Continued)

(58) Field of Classification Search
CPC ................ C02F 1/22; C02F 1/26; C02F 1/40; C02F 1/68; C02F 1/681; C02F 1/682; C02F 2001/5218; B01D 17/0211; B01D 17/0214; B01D 17/02; B01D 11/04; B01D 11/0446; B01D 11/0449; B01D 11/0453; B01D 21/003; B01D 21/0033; B01D 21/0036; B01D 21/0039; B01D 21/009; B01D 21/0024; B01D 21/10; B01D 21/24; B01D 21/2405; B01D 19/00; B01D 19/0068; B01D 19/0073; F25J 2290/60; F25J 2290/62; F25J 2290/72; F25J 2210/62; F25J 2220/02; F25J 2220/68; F25J 3/00; B65D 25/02; B65D 25/04; B65D 25/38; B65D 25/52; B65D 88/78; B65D 88/08; B65D 88/06; B65D 88/10; B65D 88/542; B65D 88/74; B65D 90/00; B65D 90/12; B65D 90/14; B65D 2205/00; B65D 2205/02; F17C 7/00; F17C 7/02; F17C 7/04; F17C 9/00; F17C 9/02; F17C 13/004; F17C 13/005; F17C 13/001; F17C 2205/00; F17C 2205/0302; F17C 2201/01; F17C 2201/0104; F17C 2203/0636; F17C 2203/0626
USPC ........... 210/774, 776, 800, 804, 242.1, 242.3, 210/521, 522, 188, 257.1, 180, 187, 532.1, 210/538; 220/560.04, 560.09, 560.11, 562, 220/564, 592.02, 501, 560.1, 560.12, 220/560.14, 4.01, 500, 505, 553, 554; 96/182, 183, 184, 187; 95/253, 254; 62/45.1, 50.1, 50.5, 50.7
See application file for complete search history.

(56) References Cited

U.S. PATENT DOCUMENTS 2,168,584 A * 8/1939 Rohlin et al. .................. 210/188
2,319,962 A * 5/1943 Walker .......................... 516/196
(Continued)

FOREIGN PATENT DOCUMENTS

DE    34 01 934    8/1985

*Primary Examiner* — Katherine Zalasky
(74) *Attorney, Agent, or Firm* — Cozen O'Connor (57) ABSTRACT

A device for collecting and separating liquids, preferably liquefied gas, the device having a first container having a bottom wall with a first tubular discharge pipe passing through it and opening out into a first storage tank. A second container is contained inside the first container. The second container has a bottom wall above the level of the first discharge pipe(s), and a top side wall including at least one drain orifice in its base communicating with a lateral passage, and a bottom side wall extending to below the level of the top end of the first discharge pipe, and a lateral passage between the side walls of the two containers. A liquid collector duct opens into the second container, and a second discharge pipe extends from above the second container and opens into a second liquefied gas storage tank.

15 Claims, 5 Drawing Sheets

(51) Int. Cl.

| | | |
|---|---|---|
| *B01D 17/02* | (2006.01) | |
| *B01D 11/04* | (2006.01) | |
| *B65D 25/02* | (2006.01) | |
| *B65D 25/04* | (2006.01) | |
| *B01D 21/24* | (2006.01) | |
| *B01D 21/02* | (2006.01) | |
| *B65D 25/38* | (2006.01) | |
| *B65D 25/52* | (2006.01) | |
| *B01D 12/00* | (2006.01) | |
| *C02F 1/40* | (2006.01) | |
| *C02F 1/68* | (2006.01) | |
| *F25J 3/00* | (2006.01) | |
| *F17C 13/00* | (2006.01) | |
| *B01D 21/00* | (2006.01) | |

(52) U.S. Cl.
CPC ....... *B01D 17/0214* (2013.01); *B01D 11/0446* (2013.01); *B01D 11/0449* (2013.01); *B01D 11/0453* (2013.01); *B01D 21/0033* (2013.01); *B01D 21/0036* (2013.01); *B01D 21/0039* (2013.01); *B01D 21/10* (2013.01); *C02F 1/22* (2013.01); *C02F 1/26* (2013.01); *C02F 1/40* (2013.01); *C02F 1/68* (2013.01)

(56) References Cited

U.S. PATENT DOCUMENTS

| | | | |
|---|---|---|---|
| 3,162,510 A | | 12/1964 | Meissner et al. |
| 3,212,232 A | | 10/1965 | McMinn |
| 3,385,074 A | * | 5/1968 | Aronson .......................... 62/537 |
| 3,762,893 A | * | 10/1973 | Larsen .......................... 48/127.1 |
| 6,024,793 A | * | 2/2000 | Bischof .......................... 117/11 |
| 7,690,365 B2 | * | 4/2010 | Lee et al. .......................... 123/527 |
| 8,808,497 B2 | * | 8/2014 | Duesel et al. .............. 159/16.1 |

\* cited by examiner

DEVICE FOR COLLECTING AND SEPARATING AQUEOUS AND/OR OILY LIQUIDS AND CRYOGENIC LIQUID

PRIORITY CLAIM

This is a U.S. national stage of application No. PCT/FR2012/052220, filed on Oct. 1, 2012. Priority is claimed on France Application No. FR 11 59486, filed Oct. 20, 2011, the content of which is incorporated here by reference.

FIELD OF THE INVENTION

The present invention relates to a device for collecting and separating aqueous and/or oily liquids and cryogenic liquid, preferably liquefied gas such as LNG (liquefied natural gas), which device is also referred to below as a "separator".

The present invention relates to more particularly to a separator for separating polluting fluids such as run-off water, oil, or indeed any other industrial liquid, when there is liquefied natural gas or LNG at −165° C. mixed in with said polluting fluids.

The present invention relates more particularly to such a separator as installed on a support installed at sea, either in open sea, or in a protected zone such as a port, and in a grounded or floating manner, i.e. either resting on, or anchored to the sea bottom, the support including both an installation for processing a liquid that is dangerous and/or corrosive, preferably liquefied natural gas (LNG), which installation is on the deck of said support, and also at least one tank for storing said liquid and incorporated within the hull of said support under said deck.

BACKGROUND OF THE INVENTION

This type of support may in particular be a barge of the floating production storage and offloading (FPSO) or floating storage regasification unit (FSRU) type for processing and storing LNG, or it may be a ship, in particular having a hull and storage tanks made of steel or of concrete as described in WO 01/30648, and as explained below.

The methane-based natural gas is either a by-product of oil fields, being produced in small or medium quantities, in general in association with crude oil, or else it is a major product from a gas field, where it is to be found in combination with other gases, mainly C-2 to C-4 alkanes, $CO_2$, nitrogen, and traces of other gases. More generally, the natural gas comprises a majority of methane, preferably at least 85% methane, with the other main constituents being selected from nitrogen and C-2 to C-4 alkanes, i.e. ethane, propane, and butane.

When the natural gas is associated in small quantities with crude oil, it is generally processed and separated and then used on site as fuel in boilers, gas turbines, or piston engines in order to produce electricity and heat for use in the separation or production processes.

When the quantities of natural gas are large, or indeed substantial, they need to be transported so that they can be used in regions far away, in general on other continents, and in order to do this the preferred method is to transport the gas while it is in the cryogenic liquid state (−165° C.) and substantially at ambient atmospheric pressure. Specialized transport ships known as "methane tankers" possess containers of very large dimensions and they present extreme insulation in order to limit evaporation while traveling.

On oil fields in open sea, situated a long way off-shore, petroleum fluids such as crude oil or gas are generally recovered, processed, and stored on board a said floating support 10 often referred to as an FPSO. Petroleum fluids such as crude oil and/or gas are then transferred to offloading ships 20 that call regularly, e.g. every week, to recover the production from the oil field and to export it to places where it is consumed. When transferring liquefied gas of the LNG type at −165° C., transfer devices include at least one pipe 17 for removing gas from the tanks of the offloading ship 20 progressively as they are filled with LNG, and in particular for removing methane gas so that it can be reliquefied on board the FPSO 10, as described below with reference to FIG. 9A.

Another technical field is one in which LNG is stored at sea close to a utilization site, e.g. in order to deliver gas to land after it has been regasified, or else to transform it on site, on-board the floating support, into electricity and for delivering said electricity to the local network on land. Under such circumstances, the ship comes to unload its cargo of LNG and the floating support is referred to as an FSRU.

The term "processor installation" is used more particularly below to designate any installation for liquefying natural gas into LNG, any installation for regasifying LNG, and/or any installation for transferring LNG between said support and a methane tanker type ship for offloading and storing LNG, which tanker may be positioned in tandem or else drawn up alongside said support.

Processor installations of this type have means or components such as pumps, flow pipes, compressors, heat exchangers, expander devices, generally in the form of decompression turbines, cryogenic heat exchangers, and containers, and also connection pipes and connection elements between these various devices.

Leaks of the liquid being processed and stored, in particular of LNG liquefied gas where appropriate, may arise either from valves, pumps, heat exchangers, containers, or pipes, or else more particularly from gaskets in coupling elements or in said components, or indeed from breakage of one or more of those various components.

Leaks of LNG are particularly dangerous for three reasons:

1) Spilt LNG gasifies quickly on making contact with air and solid surfaces, and by mixing with ambient air it creates a very dangerous mixture that explodes in the presence of the slightest spark or slightest hot point.

2) Equipment conveying or containing LNG (−165° C.) is made out of material capable of withstanding such cryogenic temperatures, in general nickel-based steels or indeed Invar. Such special steels are very expensive, and in general they are not used for support elements or for the structure of the FPSO, which are generally made out of ordinary steels. However, such ordinary steels become brittle on contact with very low temperatures and they lose their mechanical strength, thus running the risk of structural elements breaking, and possibly even of the deck of the FPSO breaking in the event of a major leak directly onto said deck, unless critical locations are protected by insulating materials that are themselves very good at withstanding cryogenic temperatures.

3) Sudden contact between large quantities of LNG and seawater is very dangerous, since the LNG (−165° C.) is heated suddenly by seawater at a temperature in the range 10° C. to 20° C., and it is heated in the presence of air, and thus in the presence of oxygen, thereby creating major risks of immediate explosion.

Means for connecting LNG leaks are generally installed in register with critical pieces of equipment so as to direct said LNG towards containers where the LNG is recuperated and then either regasified and delivered to a flare in order to be eliminated, or else transferred by pumping to one of the storage tanks of the FPSO. Such collector means are generally uncovered, and as a result they may also collect all kinds of pollution, such as oils leaking from various machines, e.g. rotary machines such as compressors, or indeed run-off water and rain or spray, generally carrying dust. Such water and oil is generally directed towards settling tanks in which, in conventional manner, the oil, the water, and the solid particles, if any, separate naturally merely under gravity, because of their different densities.

The fact that the cryogenic liquid, and in particular LNG at $-165°$ C., is present in the polluting fluids makes direct use of such settling tanks impossible and it is necessary beforehand to separate the LNG from the other polluting agents before they enter into said settling tank.

OBJECT AND SUMMARY OF THE INVENTION

The object of the present invention is to remedy the consequences associated with those problems of leaks of liquid, including cryogenic liquid, in particular of liquefied gas, by initially separating the LNG from the other polluting liquids, and doing so in a manner that is suitable for use in particular on the deck of such a support at sea.

To do this, the present invention provides a device for collecting and separating liquids, not only aqueous and/or oily liquids but also cryogenic liquid, preferably liquefied gas such as LNG, the device comprising:

a) a first container comprising:
  a.1) a bottom wall referred to as a "first" bottom wall, having at least a first tubular discharge pipe passing therethrough, said first discharge pipe extending over a height h above said first bottom wall and preferably opening out at its bottom end into a storage tank for storing aqueous and/or oily liquid, referred to as a "first" storage tank;
  a.2) a preferably-vertical side wall referred to as a "first" side wall; and
  a.3) preferably, a cover or roof covering the top end of said first container, said cover or roof having a first discharge orifice suitable for allowing a gas to be discharged;
b) a second container contained inside said first container, said second container comprising:
  b.1) a preferably-sloping bottom wall, referred to as a "second" bottom wall, the bottom wall being positioned above the level of the top end of said first discharge pipe(s), said second bottom wall co-operating with said first bottom wall to define a bottom compartment of said first tank; and
  b.2) a preferably-vertical top side wall, referred to as a "second" top side wall, defining said second bottom and extending over said second bottom facing said first side wall, preferably at a constant distance from said first side wall, said second top side wall having at least one drain orifice in its base immediately above said second bottom wall, referred to as "second" drain orifice(s), the second drain orifice(s) communicating with a lateral passage; and
  b.3) a preferably vertical bottom side wall, referred to as the "second" bottom wall, extending under said second bottom facing said first side wall, preferably at a constant distance from said first side wall, and extending to below the level of the top end of said first discharge pipe(s), said lateral passage being defined on one side by said second top and bottom side walls and on the other side by said first side wall;
c) at least one liquid collector duct suitable for receiving the liquids that are to be separated and for pouring them into said second container, said collector duct passing through said first side wall of said first container or through its cover or roof and/or opening out into said second container or into the top compartment of said first container above the open top end of said second container;

d) at least one second discharge pipe, preferably opening out at one end to an LNG storage tank referred to as the "second" LNG storage tank, outside said first container, said second discharge pipe passing through said first side wall of said first container or its cover or roof and/or opening out at the other end into said first container above the open top end of said second container; and e) said first container being filled with water or co-operating with a water feed device suitable for filling it with water in said lateral passage and in said bottom compartment of said first container under said second container, preferably seawater at ambient temperature, up to a level above the top end of said first discharge pipe(s) and below said second drain orifices of said second container.

It can be understood that:
  said second container is smaller than the first container both in the height of its side wall and in its horizontal cross-section;
  said bottom compartment of said first container is open at the level of said lateral passage;
  said lateral passage constitutes a passage that is unavoidable serving, as appropriate, to enable a liquid to pass from the inside of said second container to said bottom compartment of the first container under said second container, and conversely, to enable the liquid to pass via said second drain orifice(s), or if the second container is full by overflowing the side wall of the second container, into the gap between the two side walls of the two containers before passing into said annular passage so long as it is not blocked, in particular by a ring of ice as described below; and
  said first discharge pipe is open or is suitable for opening at its top end and at its bottom end, such that when said first container is full, it empties by passing via said open top end of said first discharge pipe.

This device co-operates with or is suitable for co-operating with a said second LNG storage tank and a said first tank for storing aqueous and/or oily liquid, preferably constituting an oil-water gravity separator device, and it thus makes it possible to discharge and to separate not only aqueous and/or oily leakage liquids, but also LNG as described below.

When the leakage liquid includes LNG, it drops into the second container and is discharged towards said first annular passage by said drain orifices. The fact that the level of water is maintained within said first container produces a hydraulic siphon effect that prevents the gas from flowing from the gas space of the first and second containers towards said first discharge pipe. Furthermore, maintaining the level of water inside the first container below said second drain orifices enables the leakage liquid and in particular the LNG to flow out from said second container via said second drain orifices. And above all, with an LNG leak, LNG making contact with water leads to the water freezing on contact being made, and to an annular plug of ice being formed along said annular passage between the lateral skirt below the second container and said first side wall, said plug preventing LNG from flowing via said first discharge pipe, said LNG accumulating in said second container and in said first container, and thus being ready for discharging separately via the second discharge orifice.

The present invention also provides a method of separating liquids comprising both aqueous and/or oily liquids and/or a cryogenic liquid, preferably liquefied gas such as LNG, with the help of a collector and separator device of the invention, wherein the method comprises the following successive steps:

1) collecting a said liquid to be separated in a said collector duct and pouring it into said second container, said first container being filled with water in said bottom compartment of said first container below said second container and up to a level above the top end of said first discharge pipe(s) and below said second drain orifices of said second container;

2) discharging said liquid to be separated via said second drain orifices at the base of said second container towards said lateral passage; and 3) depending on the nature of the liquid to be separated, performing one of the following steps 3a) or 3b):

3a) if the liquid comprises an aqueous and/or oily liquid, taking the liquid to a said first discharge pipe, preferably by putting into operation a device for feeding and circulating water to accelerate the discharge of water via a said first discharge pipe, said water feed and circulation device simultaneously maintaining the water level within said container above the top end of said first discharge duct and below said second drain orifices of said second container; and 3b) if the liquid comprises a cryogenic liquid, preferably liquefied gas such as LNG, the liquid causing a plug of ice to be created on making contact with the water in said lateral passage, or indeed a layer of ice over the entire surface of the water within the compartment of said first container, such that 3b.1) if the quantities and the flow rates of cryogenic liquid within said second container mean that the volume of cryogenic liquid does not overflow from said second container, said cryogenic liquid can be regasified by lowering its temperature in contact with the side and bottom walls of said second container and discharged via said first discharge orifice in said first container; and 3b.2) if the quantities and the flow rates of cryogenic liquid within said second container mean that the volume of cryogenic liquid overflows from the second container and fills the top compartment of said first container at least in part, said cryogenic liquid can be discharged via said second discharge pipe into a said second storage tank.

More particularly, said second storage tank is fastened against and outside a side of a support installed at sea and including a processor installation on the deck of said support, said deck comprising or supporting first transfer means suitable for enabling liquid flowing from at least a portion of said installation to be transferred merely under gravity towards a said collector duct of a said collector and separator device having a said second discharge pipe opening out at its other end into a said second LNG storage tank, and said first container is fed with water constituted by seawater at ambient temperature.

In a first variant embodiment, a collector and separator device of the invention comprises:

a) a said first container comprising:
   a.1) a said first bottom wall having a first tubular discharge pipe passing therethrough, preferably a vertical central tube;
   a.2) a said first side wall that is cylindrical and vertical; and
   a.3) a said cover or roof covering the top end of said first container, said cover or roof having a first gas discharge orifice;
b) a said second container contained inside said first container, said second container comprising:
   b.1) a said second bottom wall that is sloping, and preferably frustoconical;
   b.2) a said second top side wall that is vertical and cylindrical, and coaxial XX' with said first side wall and of smaller horizontal section; and
   b.3) a said second bottom side wall forming a peripheral lateral skirt that is cylindrical, vertical, and coaxial XX' with said first side wall and of smaller horizontal section, extending under said second bottom around the top end of said first discharge pipe, preferably extending said second top side wall; and
c) a said lateral passage forming an annular passage, preferably of constant width, between said second top and bottom side walls and said first side wall of said first container.

More particularly, said first and second top and bottom side walls and said first discharge pipe are cylindrical, coaxial, and circular in section.

In another embodiment, said first and second top and bottom side walls are of square or rectangular section.

In a second variant embodiment, said first side wall forms a said first container that is an elongate rectangular parallelepiped and said second top side wall forms a said second container that is a rectangular parallelepiped of the same length and of smaller width than said first container, said first bottom wall having a plurality of said first discharge pipes passing therethrough, being arranged parallel to one another in succession in the longitudinal direction YY' of said first bottom wall, said second top side wall including a plurality of said second LNG discharge pipes in its top portion, and said first and second containers are arranged relative to each other in such a manner that said lateral passage is in the form of a longitudinal rectangular parallelepiped, said drain orifices and said lateral passage extending along a single longitudinal edge of said second bottom wall.

It can be understood that if said lateral passage extends along only one longitudinal face of said second side wall, the other longitudinal face of said second side wall of said second container may either be pressed against a face of the first side wall of said first container or else may be common therewith in part.

In a preferred embodiment, said second bottom wall is supported by and secured to support structures referred to as "legs" standing on said first bottom wall, said support structures preferably presenting extensive contact areas with the water contained in said bottom compartment of said first container under said second container, and suitable for enabling heat to be transferred between the water contained in said first container and said second bottom wall.

Also preferably, said second bottom wall supports and is secured via its under face to preferably vertical metal or steel plates constituting extensive contact areas with the water contained in said first container under a said second container, suitable for transferring heat between the water contained in said first container and the liquid contained in said second container, said metal plates not being in contact with said first bottom wall of said first container.

It can be understood that said metal plates form radiator fins. This embodiment is advantageous in that it serves to encourage and accelerate boiling of the LNG, and thus complete vaporization thereof, when it happens to be present in small quantities with in said second container, because the heat in the volume of water in contact with the legs is transferred more quickly to the second bottom wall in contact with said LNG.

Also preferably, said first container comprises at least a first water feed orifice, preferably passing through said first side wall and/or said first bottom wall, opening out into said first container below the level of the bottom end of said second bottom side wall and co-operating with a device for feeding and continuously circulating water outside said first container, said water feed and circulation device being suitable for discharging said water via said first discharge pipe.

Thus, it is possible firstly to maintain the level of water on the inside below said first drain orifices so that the leakage liquid and in particular the LNG can flow out from said second container via said drain orifices, and secondly to avoid gas flowing from the gas space of the first and second containers towards said first discharge pipe.

However, in addition, continuously circulating water makes it possible to avoid ice forming throughout the volume of water within said first container below said second container so as to limit the formation of ice to a surface disk of ice on the surface of the water, because of the heat that is brought in continuously by said circulating water. This formation of ice is due to heat being transferred to the LNG from the volume of water via the second bottom wall and via the gaseous atmosphere between the second bottom wall and the surface of the water, said transfer taking place above all via said legs.

In another embodiment, a device is used for triggering the circulation device comprising a pump, e.g. use is made of a float on the surface of the water to control triggering of the pump as soon as the water level drops below the top end of said first duct, as in a flushing system.

More particularly, said first container further comprises a second water discharge orifice and/or a second water discharge pipe, preferably passing through said first side wall or first bottom wall, opening out into said first container below the level of the bottom end of said second bottom side wall and co-operating with a said device for continuously circulating water outside said first container, said water being discharged via said second water discharge orifice in such a manner as to maintain the level of the water inside said first container below said second drain orifices. This embodiment makes it possible to enhance and accelerate the transfer of heat from the volume of water to the LNG within said second container, in particular when a surface disk of ice has formed and prevents flow, with water being discharged via said first discharge pipe.

Still more particularly, said first liquid storage tank comprises a water-oil gravity separator device suitable for separating an oily phase and an aqueous phase and for discharging them separately.

Also advantageously, at least said first and second top and bottom side walls and said first and second bottom walls and said legs are made of sheet metal or steel.

The present invention also provides a support installed at sea, grounded on the sea bottom or floating, including a processor installation that might generate leaks of aqueous and/or oily liquids, and also leaks of cryogenic liquid, preferably of liquefied gas such as LNG, wherein the support is fitted with a collector and separator device of the invention.

More particularly, a support of the invention includes a said processor installation on the deck of said support, and at least one first LNG storage tank incorporated within the hull of said support under said deck, and it includes at least one second LNG cryogenic liquid storage tank situated outside said support and situated at least in part, and preferably entirely, below the deck of said support on which said installation stands, said second LNG storage tank being fastened against a side of said support, preferably in reversible manner, said deck comprising or supporting first transfer means suitable for enabling liquid flowing from at least a portion of said installation to be transferred merely under gravity towards a said collector duct of a said collector and separator device having a said second discharge pipe opening out at its other end into a said second LNG gas storage tank, said first leakage liquid transfer means preferably comprising sloping decking that extends from under a said portion at least of the installation to a said collector duct.

Still more particularly, said second LNG storage tank further comprises a pump and a second connection pipe suitable for transferring said cryogenic liquid contained in said second tank to a said first storage tank within the hull of said support.

These first transfer means may comprise gutter-forming structures and possibly also pipe elements and/or liquid pumping means.

Positioning and reversibly fastening said second storage tanks in the form of containers outside the support of the present invention, referred to below as "outside containers" presents the advantages of:

being able to build said support in a dry dock of dimensions that are standard in terms of width or length, i.e. without requiring a dry dock of excessive dimensions, with this being advantageous since the size of a dry dock is a factor that is very limiting on the size of a support and thus also on the storage capacity of the tanks it contains; and being able to fabricate said outside containers separately, where appropriate, closer to the site at sea than said dry dock in which the support is built, and to fasten said outside containers on said support, either before it is towed to the site, or else on site after said support has been towed and anchored or grounded on the sea bottom; and above all improving safety on board said support concerning the risks of incident and/or explosion, in particular by quickly removing any leakage liquid away from said support and then emptying said outside container in such a manner as to return the entire installation as quickly as possible to maximum safety.

It can be understood that using said first transfer means firstly avoids any contact of the leakage liquid with the deck of the support for example, and more generally with any structure of the support, and secondly avoids prolonged contact with atmospheric air.

The present invention thus advantageously makes it possible essentially to collect LNG leakage flows and to direct them to said second LNG storage tanks or said "outside containers", i.e. containers situated outside the barge and lower down, so that the flows take place naturally merely by gravity and as quickly as possible without making contact with the structure of the support and in particular with its deck, and without prolonged contact with the base of the processor installations, thereby limiting the quantity of LNG that runs the risk of vaporizing and creating an explosive gas mixture in contact with ambient air.

The term "side of said support" is used herein to mean the longitudinally-extending side walls, and also the front and rear transverse walls (bow and stern).

A plurality of collector and separator devices of the invention and of said outside containers can thus be installed on the starboard and port walls of the hull, and where appropriate, on the stern and a bow walls, each of them collecting liquid coming from one or more decking elements covering a small area of the deck.

Advantageously, the walls or the surfaces of said collector device that might come into contact with said leakage liquid that it collects, in particular the top surface of the central portion of said decking, are constituted by or covered in a layer of material that withstands the cryogenic temperatures (less than or equal to −160° C.) of said leakage liquid such as LNG, in particular a composite material such as the Chartek®-Intertherm® 7050 sandwich sold by the supplier International (UK) of the AKZO-NOBEL group, and more particularly suitable for providing cryogenic thermal insulation for LNG at −165° C.

Still more particularly, said support of the invention of the invention includes attachment means suitable for fastening a plurality of said containers along its sides, and each of said containers presents a volume of no more than 300 cubic meters ($m^3$), and preferably lying in the range 50 $m^3$ to 300 $m^3$.

Outside containers of this volume can be built using a structure of smaller size than is needed for building the internal tanks since there is no need for a high degree of insulation, but rather a need for limited heat transfer through the wall to enable the recovered LNG to vaporize quickly but without causing the metal structure of the container or of its supports to drop below a temperature in the range −20° C. to −40° C., since that would run the risk of leading to brittle fracture of the material of said structure.

Still more particularly, said outside container has an elongate cylindrical shape with a vertical longitudinal axis (YY') with only a portion of said outside container being immersed, and in particular with a horizontal cross-section that is square or rectangular or circular.

The term "vertical axis" is used herein to mean that the axis of the outside container is substantially perpendicular to the horizontal longitudinal axis XX' of the support and substantially perpendicular to the level of the sea when the sea is flat.

A portion of said outside container remains immersed even when it is empty, and a portion of the container remains above the level of the sea even when said container is full.

The vertical elongate shape of the outside containers is advantageous in comparison with containers of greater horizontal size in that pumping out LNG leaves a residue of LNG at the end of pumping that is proportional to the horizontal section of said container, and thus smaller than for a container of large horizontal size. With a large horizontal size, it is advantageous for the bottom of the container to be sloping, so that the pumping device can be placed at its low point.

In a variant embodiment, said outside container includes a leaktight stationary bottom wall at the bottom end of its cylindrical side wall.

Preferably, the walls of said outside container are thermally insulated, and preferably insulated internally, in particular with polyurethane foam. This thermal insulation seeks to limit heat transfer due to the LNG rising in temperature, so as to keep the temperature of the steel walls of the outside container, and in particular the side walls situated above sea level, at a temperature that is higher than the brittle fracture temperature of said steel, and in particular a temperature that is higher than −10° C. If this is not done, said heat transfer runs the risk of cooling the steel structural elements of the container to below a temperature at which the steel presents risks of brittle fracture, i.e. a temperature below a temperature in the range −20° C. to −40° C.

Advantageously, said outside container comprises or co-operates with second transfer means comprising a pump and a second connection pipe suitable for transferring said leakage liquid contained in said outside container to a said storage tank within the hull of said support. In particular, said outside container possesses an internal pipe going down to the bottom, which pipe is connected to a pump enabling said outside container to be emptied and delivering the liquefied gas to a storage tank of the floating support.

Also advantageously, said outside container further comprises heater means for heating said liquid contained in said outside container, said heater means preferably being joule effect heater means, said heater means more preferably being incorporated in or against said cylindrical side wall of the outside container or of its thermal insulation layer.

More particularly, a heater device is an electrical heater device or a device for heating with a flow of hot water or steam. In the event of the draining by pumping the liquid phase, said heater device is advantageously situated in the bottom portion of the outside container, thus making it possible after emptying to finish off complete purging of said outside container by vaporizing and eliminating the remaining methane gas in a flare, or merely to the open air. In the event of there being no device for draining by pumping, said heater device is advantageously arranged over all or part of the height of the wall of the outside container, and where appropriate, over the bottom of said outside container.

More particularly, said outside container further includes a top gas discharge orifice, preferably level with the top wall of the tank, suitable for allowing the liquid LNG still contained inside the container after evaporation of the LNG to be discharged from the container with the help of a connection pipe leading to a combustion flare or to the gas space of a said first tank within the hull, or to the open air.

Still more particularly, said outside container also includes another top orifice, preferably level with the top portion of the cylindrical side wall of the outside container, and suitable for co-operating with a device for injecting a foaming agent. This injection of foaming agent seeks to create an inert medium inside the outside container when the outside container begins to fill with LNG. In other words, said foaming agent is injected when a leak is detected in said installation. Preferably, said outside containers are initially filled with an inert gas such as nitrogen.

BRIEF DESCRIPTION OF THE DRAWINGS

Other characteristics and advantages of the present invention appear in the light of the following detailed description of one or more particular embodiments given with reference to the following figures, in which:

FIG. 2 shows in axial vertical section and in side view a liquid separator of the invention, constituted by a first container referred to below as a "receiver vat" 1-1 and by two lateral water inlet orifices in its bottom portion, by a discharge pipe 1e for discharging said water passing through the bottom 1c of said receiver vat, by a second container referred to below as a "cup" 1-2 collecting the liquids to be separated 3 or 4, said cup having a sloping bottom 2b and presenting a plurality of emptying orifices 2d in its bottom portion that are in communication with said receiver vat 1-1. A cover, preferably a leaktight cover 1g, covers said receiver vat 1-1, said cover being provided on top with a gas discharge orifice 1h and on the side with a second liquid discharge orifice 1f. A flow of seawater 1-1a is established in permanent manner within said receiver vat 1-1;

FIG. 7D is a side view in vertical axial section of a device in the presence of a large amount of pollution of the liquefied natural gas of LNG type, referred to as "major" pollution, pouring into the cup and then filling it completely and overflowing from said cup into the receiver vat filled with seawater. The LNG heats on coming into contact with the seawater contained in the receiver vat. A ring 6 of ice then forms between the outside face of the second top and bottom side walls $2a$, $2c$ of the cup and the inside face of the first side wall $1b$ of the receiver vat, with all of the LNG+gas pollution thus being blocked and not being capable of reaching the central tube passing through the bottom of said receiver vat. When the receiver vat is full, the LNG 4 pours via the top second discharge orifice $1f$ into a second storage tank constituted by an external container 1-4 of large dimensions;

MORE DETAILED DESCRIPTION

FIGS. 1 to 7 show a first variant embodiment of a separator 1 of the invention, comprising a first container or receiver vat 1-1 and a second container or cup 1-2 that are cylindrical and coaxial about an axis XX'.

Figures 1, 1A:
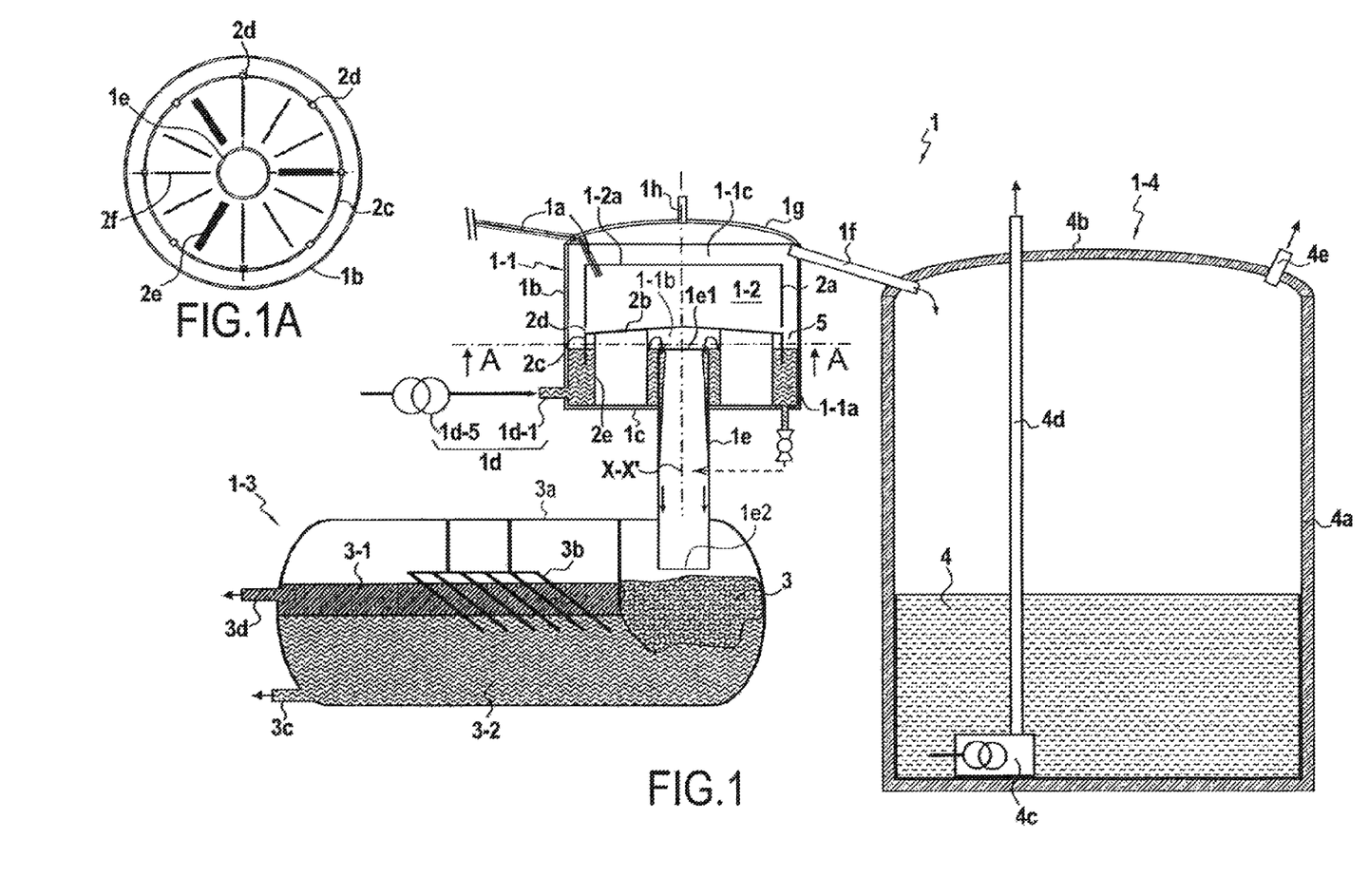
FIG. 1 shows in axial vertical section and in side view a liquid separator device of the invention connected to a first tank 1-3 for storage and gravity separation of water-oil and to a second tank 1-4 for storage of LNG.
FIG. 1A is a horizontal section and a plan view on plane AA of FIG. 1, showing said separator device of the invention of circular section.

In FIGS. 1 and 1A, the first side wall $1b$ of the first container and said second top side wall $2a$ and second bottom side wall $2c$ of the second container, and also said first discharge pipe $1e$ are of circular section, whereas in FIGS. 3A-3B and 4-5, said first side wall $1b$ and said second top and bottom side walls $2a$, $2c$ are square in section.

Figure 9A:
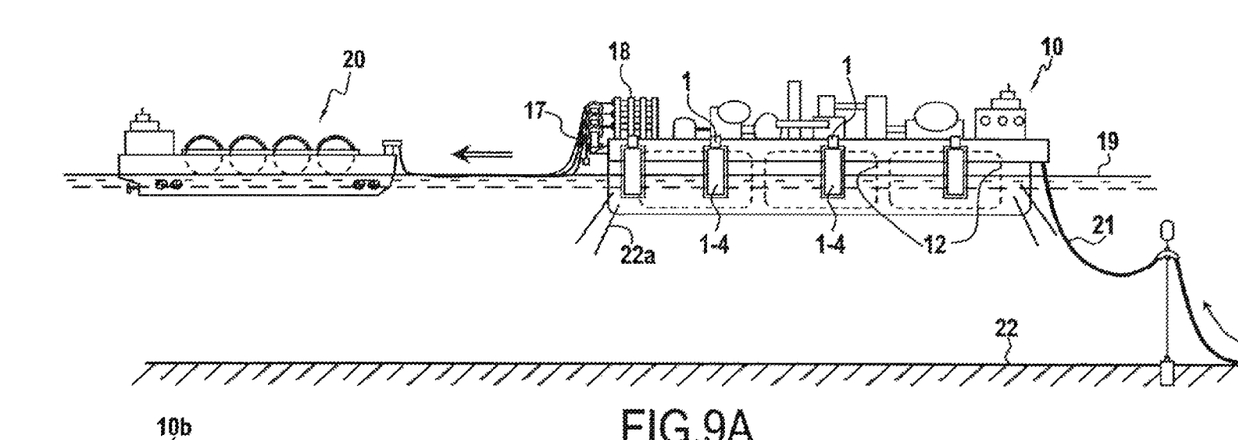
FIG. 9A is a side view of a floating support 10 for producing LNG from natural gas in the process of transferring its production to an offloading ship 20 of the methane tanker type.
Figure 9B:
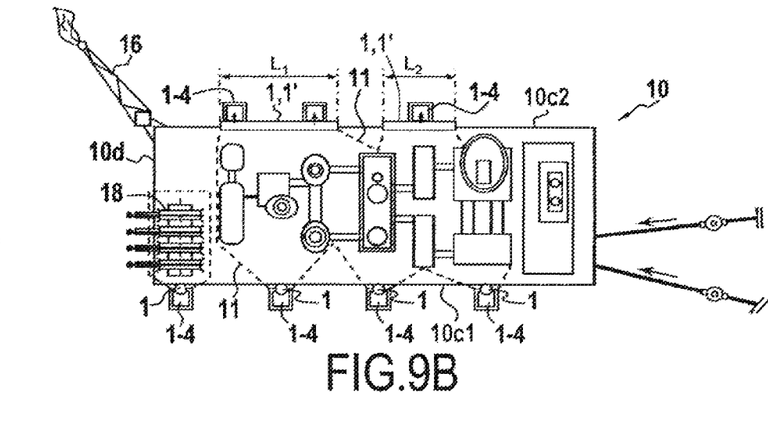
FIG. 9B is a plan view of the floating support 10 of FIG. 9A.
Figure 9C:
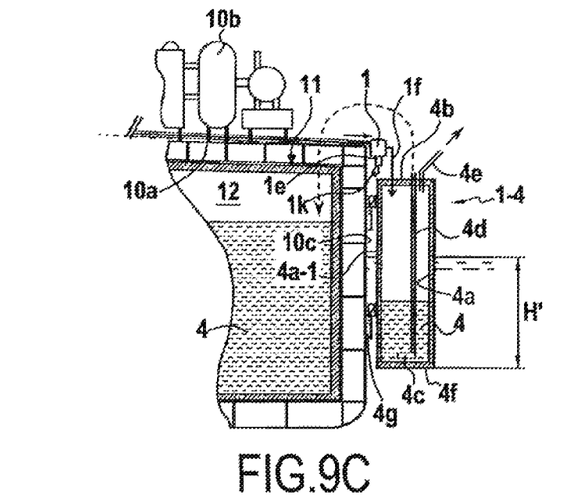
FIG. 9C is a side view in vertical section of the floating support 10 of FIGS. 9A and 9B, including separator devices 1, 1' of the invention comprising said second storage tanks constituted by external containers 1-4.

In FIG. 1, there can be seen a cryogenic separator of the invention 1 receiving polluting components via a collector duct that includes chutes or gutters, where such polluting components may be run-off water, oil leaks, or LNG leaks, coming from equipment in a processor installation $10b$ installed by way of example on board a floating support 10 for producing LNG, as shown in FIGS. 9A-9B-9C and described below.

In its bottom portion, via at least one feed orifice $1d$, said receiver vat 1-1 receives water $1$-$1a$, e.g. seawater, which preferably flows on a continuous basis, the flowing water leaving by overflowing the top end $1e1$ of the first discharge pipe $1e$. The overflow is then directed at the bottom end $1e2$ of the first discharge pipe $1e$ towards a first storage tank 1-3 comprising a water-oil gravity separator device or settling tank known to the person skilled in the art, e.g. constituted by an elongate cistern $3a$ having internal stabilization baffles $3b$, a bottom water outlet orifice $3c$, and a top oil outlet orifice $3d$. In the event of oil pollution, the oil-water mixture 3 arrives via said first discharge pipe $1e$ that leads to one longitudinal end of the first storage tank 1-3. Pumping and control means (not shown) cause the liquids 3 to advance through the internal stabilization baffles $3b$ towards the bottom water outlet orifice $3c$ and top oil outlet orifice $3d$ at the other longitudinal end of the first storage tank 1-3. The aqueous phase 3-2 and the oily phase 3-1 separate under the effect of gravity, the oily phase 3-1 being found in the top portion and being discharged via $3d$, and the aqueous phase 3-2, together with solid particles, being found in the bottom portion and being discharged via the bottom water outlet orifice $3c$.

In the top portion of the receiver vat 1-1, and LNG outlet pipe $1f$ communicates with a said second LNG storage tank in the form of a said external container 1-4 constituted by a casing $4a$, a leaktight cover $4b$ if any, pump means $4c$ discharging the LNG 4 via an LNG discharge pipe $4d$, and an orifice 4e for discharging the gas that results from vaporizing the LNG. The detail of the operation of the separator in the presence of water, oil, and/or LNG, is described in greater detail below in the description of the invention.

Figure 3A:
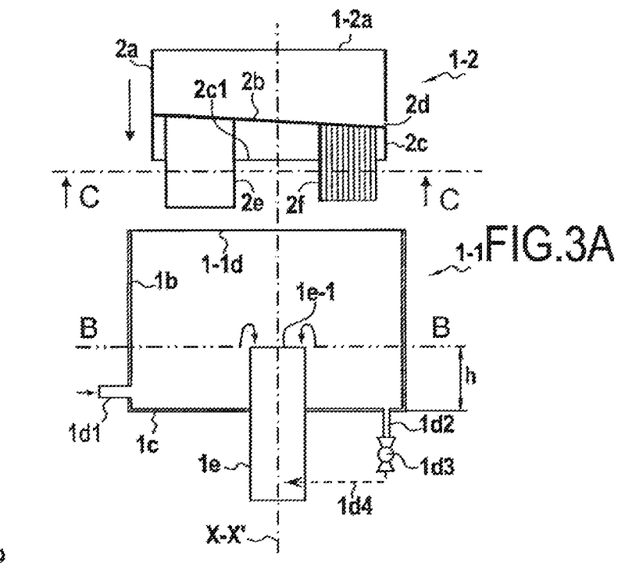
FIG. 3A shows in axial vertical section and in side view, the pre-assembly of the cup in the receiver vat, said cup having a plurality of legs for standing on the bottom of said receiver vat.

In FIG. 3A, there can be seen the receiver vat 1-1 and its first discharge pipe 1e. Inside said receiver vat 1-1, there is the second container 1-2 made up of a cup having a sloping said second bottom wall 2b and a peripheral said second top side wall 2a, a plurality of drain orifices 2d of small diameter, e.g. 20 millimeters (mm) in diameter, being pierced in the lowest zones of said second top side wall 2a.

In FIGS. 2, 3A-3B, and 5, the second bottom wall 2b is plane and slopes towards the right, with the drain orifices 2d being at the bottom of the slope, while in FIG. 1, the second bottom wall 2b is conical in shape, thus making it possible to distribute a larger number of drain orifices 2d over the entire circular periphery of the base of the second top side wall 2a, as shown in FIG. 1A. In both variant embodiments, the first bottom wall 1c is plane and horizontal.

The second bottom side wall 2c hereinafter called the skirt 2c forms a continuous peripheral skirt secured to the under face of the second bottom side wall 2b, preferably so as to be in continuity with the second top side wall 2a. The bottom edge 2c1 of said skirt 2c is substantially horizontal, and thus preferably parallel to the plane of the first bottom wall 1c of the receiver vat 1-1, when said cup 1-2 is resting on said first bottom wall 1c, as shown in FIGS. 1, 2, and 3B: legs 2e, preferably at least three legs, that are secured to the under face of the second bottom wall 2c of the cup 1-2 enable said cup to be positioned in said receiver vat 1-1.

Once legs 2e of the cup 1-2 have been placed on said first bottom wall 1c of the receiver vat 1-1, the top end 1-1d of the first side wall 1b of the receiver vat 1-1 is covered by the cover 1g. The portion of the receiver vat 1-1 that is situated beneath the second bottom wall 2b constitutes a bottom compartment 1-1b, while the top portion above the top ended 1-2a of the cup 1-2 constitutes a top compartment 1-1c of the receiver vat 1-1.

Figure 2:
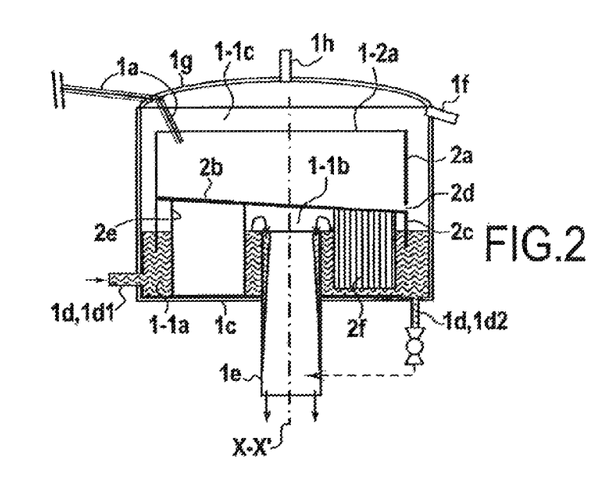
Figure 3B:
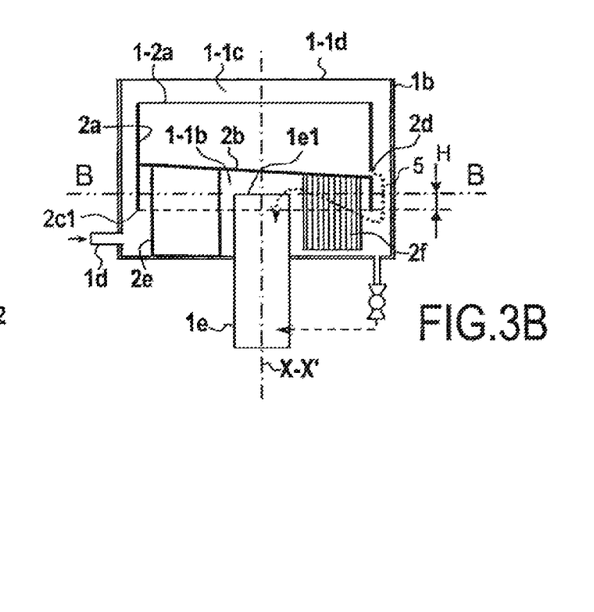
FIG. 3B shows in axial vertical section and in side view, the cup standing on the bottom of said receiver vat, with the path followed by the liquids arriving in the cup and dropping into the receiver vat being shown in dotted lines.
Figure 5:
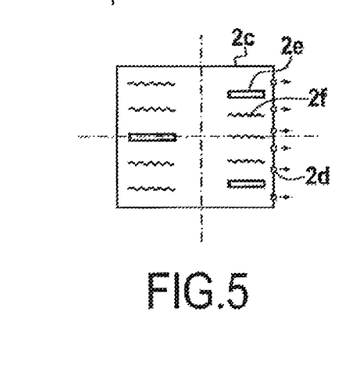
FIG. 5 shows in horizontal section and in plan view the second container of square shape, referred to below as a "cup" and provided with three legs and with fins for heating the sloping bottom of said cup.

FIG. 5 is a view from beneath the cup, in section on plane CC of FIG. 3A, in which there can be seen three legs 2e together with seven fins 2f of height slightly shorter than the height of the legs 2e so that they do not rest on the first bottom wall 1c when the three legs 2e of the cup 1-2 are resting on said first bottom wall 1c, as shown in FIGS. 2 and 3A. The function of these fins 2f is to transfer heat from the water 1-1a to the liquid contained in the cup 1-2, as explained in greater detail in the description below of the invention. The height of the legs 2e is adjusted so that when said cup 1-2 is resting on the bottom of the receiver vat 1-1, the plane of the bottom edge 2c1 of the skirt 2c is substantially horizontal and substantially parallel to the substantially horizontal first bottom wall 1c of the receiver that 1-1, the distance between the plane of said edge 2c1 and the plane BB tangential to the plane of the first discharge pipe 1e having a value H lying in the range 3 centimeters (cm) to 20 cm, and preferably lying in the range 5 cm to 10 cm, as shown in FIG. 3B.

As shown in FIG. 5, the legs 2e are advantageously constituted by metal plates forming a vertical tubular hollow rectangular parallelepiped, thus providing four vertical plane faces in contact with the water 1-1a, and the fins 2f are constituted by pieces of vertical parallel corrugated sheet providing a relatively extensive area of contact with the water 1-1a, in which they are immersed.

The diameter or the long side in cross-section of said receiver vat 1-1 lies in the range 0.5 meters (m) to 3 m approximately, the width of the annular passage 5 (the distance between the first side wall 1b and second bottom and top side walls 2a-2c) lies in the range 3 cm to 10 cm, and the diameter of said first discharge pipe 1e lies in the range 5 cm to 30 cm approximately.

The height h of the tube 1e above the first bottom wall 1c lies in the range 5 cm to 50 cm approximately. Thus, as shown in FIG. 2, if water 1-1a is injected continuously via the orifices 1d, 1d1-1d2, the water fills the bottom of the receiver vat 1-1 up to the level of the plane BB of the top end 1e1 of the first discharge pipe 1e, and then the excess water pours into the first discharge pipe 1e in order to reach said first storage tank 1-3 constituted by a settling tank. The bottom portion of the skirt 2c is then immersed in the layer of water to a depth H and the device 1 thus constitute a siphon that serves to physically isolate the transfers of gas between the top portion of the receiver vat 1-1 and said first discharge pipe 1e. The path followed by the liquid 3, including oily phase 3-1 and aqueous phase 3-2 or a mixture of both, as poured into the cup 1-2 is drawn in dotted lines in FIG. 3B:

said liquid 3 goes towards said second bottom wall 2b of the cup 1-2, passing via the plurality of drain orifices 2d towards the peripheral space forming an annular lateral passage 5 situated between the skirt 2c and the periphery of the first side wall 1b of the receiver vat 1-1;

then said liquid 3 passes under the bottom edge 2c1 of said skirt 2c; and finally, said liquid 3 is entrained towards the top end 1e1 of the first discharge pipe 1e by a flow effect facilitated by the water 1-1a being caused to flow with the help of a pump 1d5.

Figure 4:
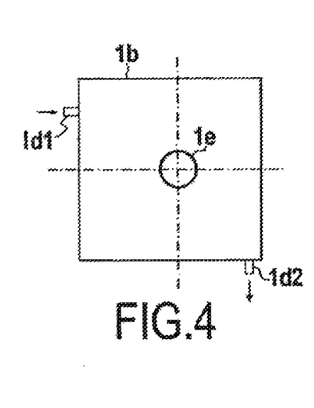
FIG. 4 shows in plan view said first container of square shape, referred to below as a receiver vat and shown without its leaktight cover.

FIG. 4 is a plan view of the FIG. 3A receiver vat 1-1, said vat 1-1 being shown on its own without its cover 1g, and it presents a section that is substantially square in shape. It has the first discharge pipe 1e together with two inlet orifices 1d1, 1d2, the inlet orifice 1d1 serving to feed it with water, the inlet orifice 1d2 being capable of serving either to feed it with water, or else to discharge water, as explained in greater detail in the description below of the invention.

Figure 6A:
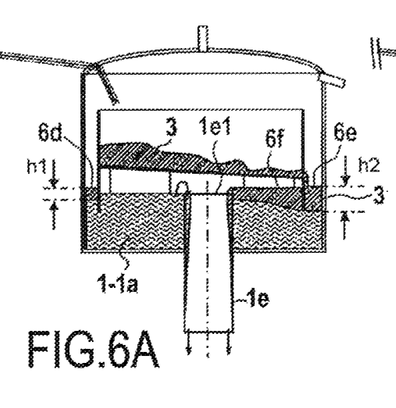
FIG. 6A is a side view in axial vertical section of the device 1 in the presence of a small amount of pollution of the oil+water type, referred to as "minor" pollution, pouring firstly into the cup and then into the receiver vat filled with seawater, all of the pollution being discharged via the central tube $1e$ passing through the bottom $1c$ of said receiver vat.
Figure 6B:
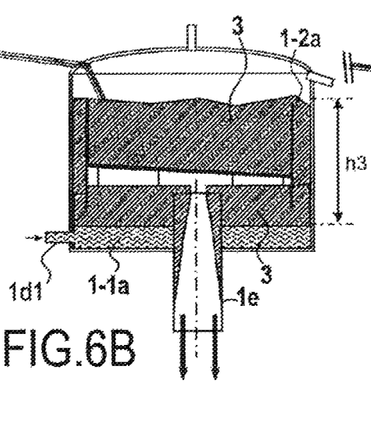
FIG. 6B is a side view in axial vertical section of a device 1 of the invention in the presence of a large amount of pollution of the oil+water type, referred to as "major" pollution, poring firstly into the cup and then overflowing from the cup over its peripheral wall, into the receiver vat filled with seawater, all of the pollution being discharged via the central tube passing through the bottom $1c$ of said receiver vat.

FIGS. 6A and 6B show the behavior of the device 1 of the invention in the presence of a liquid 3 constituted by a mixture of run-off water and of oil coming from a rotary machine such as a compressor:

if the liquid 3 is present in small quantity and at a small flow rate, as shown in FIG. 6A, then a ring 6d of small thickness h1 forms all around the skirt 2c and remains in place without being discharged, as shown in the left-hand portion of said FIG. 6a;

if the liquid 3 is present in greater quantity and flow rate, as shown in the right-hand portion of the same FIG. 6A, then the liquid 3 accumulates on the annular periphery 6e of the skirt 2c over a greater thickness h2 because the density of the mixture remains less than the density of the seawater 1-1a inside the vat 1-1. Thereafter, the liquid 3 passes under the bottom edge 2c1 of the skirt 2c and reaches the other side 6f of the skirt 2c so as to reach the open top end 1e1 of the first discharge pipe 1e leading towards the storage tank 1-3. When the pollution comes to an end, there remains on the periphery of the skirt 2c a ring of oil that cannot be eliminated except by washing the cup 1-2 with water at a high flow rate, and where appropriate together with dispersing or emulsifying agents that then go in the same manner towards the storage tank 1-3; and in the event of a very large amount of pollution, as shown in FIG. 6B, all of the drain orifices 2d of the cup 1-2 taken together do not suffice to discharge the pollution: the cup 1-2 fills and the liquid 3 overflows said second top side wall 2a, the liquid 3 filling said vat 1-1 up to a height h3 above the water 1-1a and filling the cup 1-2. The discharge of the liquid 3 through the first discharge pipe 1e passing under the skirt 2c accelerates correspondingly. When the leak comes to an end, the cup 1-2 empties slowly via the orifices 2d, thereby returning to the preceding situation.

In the event of pollution with LNG 4, the device 1 behaves differently to its behavior in the presence of oil, of water, or of a water-oil mixture. This behavior is shown in FIGS. 7A-7D.

Figure 7A:
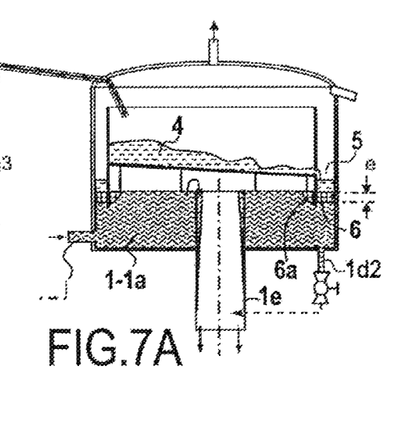
FIG. 7A is a side view in axial vertical section of a device 1 in the presence of a small amount of pollution of the liquid natural gas or LNG type, referred to as "minor" pollution, pouring firstly into the cup and then into the receiver vat filled with seawater, the LNG heating on contact with the seawater contained in the receiver vat. A ring of ice 6 then forms in the passage 5 between the outside face of the second side top and bottom walls $2a$, $2c$ of the cup and the inside face of the first side wall $1b$ of the receiver vat, all of the LNG+gas pollution thus being blocked and being incapable of reaching the central tube $1e$ passing through the first bottom wall $1c$ of said receiver vat.

In FIG. 7A, LNG 4 is shown arriving in the cup 1-2 at a low rate. The LNG 4 flows along the sloping second bottom wall 2b and exits via the drain orifices 2d. On making contact with the water 1-1a, which delivers heat, the LNG 4 vaporizes and escapes via the top orifice 1h, from which it is taken by pipes that are not shown towards a flare 16 as shown in FIG. 9B in which it is burnt. Because the water 1-1a transfers heat to the LNG 4, a ring 6 of ice is formed after a few minutes in the annular lateral passage 5, which ring of ice is of thickness e that varies and that increases over time. In addition, ice 6a begins to form on the inside face of the skirt 2c. This ring 6 of ice constitutes a plug that then isolates the top portion of the receiver vat 1-1 filled with LNG 4 from its bottom portion filled with water 1-1a in the annular lateral passage 5, thereby preventing any LNG or gas resulting from said LNG vaporizing being transferred towards the first discharge pipe 1e, and thus towards the settling tank 1-3.

Figure 7B:
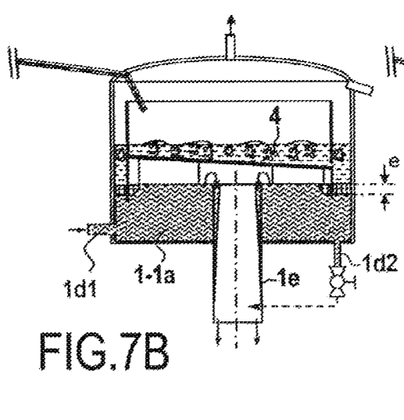
FIG. 7B shows the stage of resorbing the minor pollution of FIG. 6A by vaporizing the LNG, heat being provided by the flow of seawater within the receiver vat, between the inlet orifices $1d$, $1d1$-$1d2$ and the central discharge tube $1e$, the legs $2e$ and the heating fins are immersed in said seawater and serve to transfer heat from said seawater to the second bottom wall $2b$ of said cup.

If the leak of LNG 4 is of small quantity, as shown in FIG. 7B, then once the ring 6 of ice has formed, the LNG is trapped between said ring, the top side wall 2a of the cup 1-2, and the side wall 1b of the receiver vat 1-1. The LNG 4 vaporizes little by little as a result of heat coming from the water 1-1a, which water is constantly renewed by entering at 1d and leaving via the first discharge pipe at 1e. This supply of heat is transferred to the cup 1-2 via the atmosphere above the water 1-1a in the bottom compartment 1-1b, and above all via the skirt 2c having its bottom portion in contact with the flowing water 1-1a, and even more via the legs 2e supporting said cup, and also via a plurality of fins 2f secured to said second bottom wall 2b of the cup and in most in said flowing water. Furthermore, a significant contribution of heat passes through the side wall 1b of the receiver vat 1-1. The gas as produced in this way is recovered from the top orifice 1h and is directed, where appropriate, to said flare 16 in order to be eliminated.

Once all of the LNG has vaporized and has been eliminated, the ring 6 of ice begins to melt and the device naturally returns to its initial configuration as described with reference to FIG. 2.

Figure 7C:
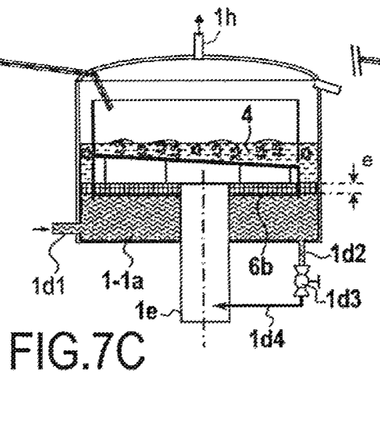
FIG. 7C shows the stage of resorbing the FIG. 6B minor pollution by vaporizing the LNG, in which stage a disk $6b$ of ice is formed that prevents any discharge of seawater through the central discharge orifice: the flow of seawater then enters via one inlet orifice $1d1$ and leaves via another inlet orifice $1d2$.

In the event of a problem in the flow of water, as shown in FIG. 7C, e.g. a failure of the feed pump 1d5 or feed at a rate that is not sufficient, there is a risk of a disk 6b of ice forming that covers the entire section of the receiver vat and of the surface of the water 1-1a, thereby preventing the flowing water 1-1a from being discharged via the first pipe 1e. For this purpose, it is advantageous to have a second orifice 1d2 provided with a valve 1d3, said valve being connected 1d4 downstream from the discharge pipe 1e. This device is advantageous concerning water flow redundancy, but it is preferable to discharge via the central pipe 1e, since it is this pipe that naturally discharges pollution constituting the liquid 3 of the water-and-oil type, as explained above.

Figure 7D:
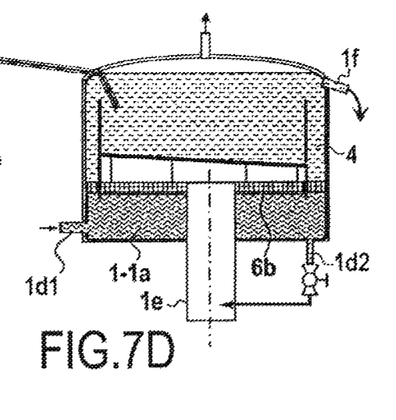

If the leaks of LNG 4 is very large, or of long duration, as shown in FIG. 7D, then the cup 1-2 fills completely, and then overflows, until it reaches the top level of the receiver vat 1-1: the LNG 4 then pours via the second discharge pipe 1f towards the second storage tank 1-4, as described with reference to FIG. 1.

When the leak of LNG comes to an end, the receiver vat 1-1 is full of said LNG up to the level of the second discharge pipe 1f. The process of heating and vaporizing the LNG as described with reference to FIGS. 7B-7C continues until said LNG has vaporized completely and the ring 6-6a of ice, or the disk 6b as the case may be, has melted.

In order to ensure that the water or the oil does not flow through the second discharge pipe 1f in the event of a large amount of pollution by a liquid 3, as described with reference to FIG. 6B, said second discharge pipe 1f may be arranged above the horizontal plane of the top edge 1-2a of the second top side wall, e.g. 10 cm to 50 cm above it. Thus, only LNG can reach this level, and this can happen only during large leaks of LNG.

In FIGS. 2, 3A-3B, 4, 5, 6A-6B, 7A-7B-7C-7D, the receiver vat 1-1 and the cup 1-2 both present a horizontal section that is substantially square, while in FIGS. 1-1A, the receiver vat 1-1 and the cup 1-2 both present a horizontal section that is circular, the bottom 2b1 of the cup 1-2 being conical in shape about an axis XX' that preferably coincides with the vertical axis XX' of the cylinder formed by the second top and bottom side walls 2a, 2c of said cup 1-2. There are eight drain orifices 2d, and they are uniformly distributed around the circumference of the cup 1-2. Said cup is supported by three uniformly distributed legs 2e, while the seven uniformly distributed heating fins 2f serve to transfer heat between the flowing water 1-1a and the second bottom wall 2b of the cup, as explained above.

Figure 8A:
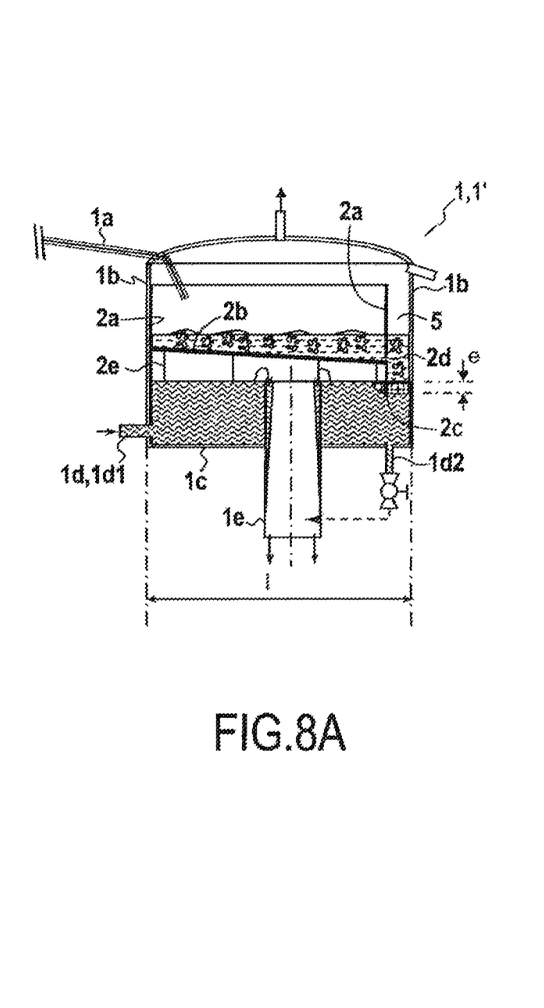
FIG. 8A is a view in vertical cross-section of a variant embodiment of a device 1 of the invention, comprising a receiver vat 1-1 of rectangular parallelepiped shape extending in a longitudinal direction YY'.
Figure 8B:
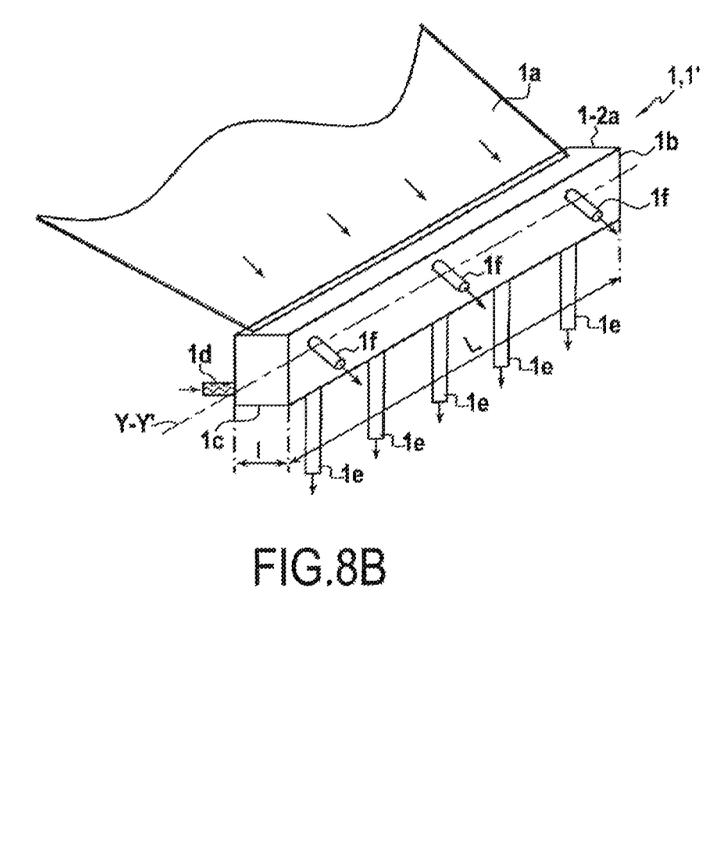
FIG. 8B is a diagrammatic perspective view of a collector and separator device 1 of the invention, in the variant of FIG. 8A.

FIGS. 8A and 8B show a second variant embodiment 1' of the device 1 in which the receiver vat 1-1 and the cup 1-2 are in the form of elongate rectangular parallelepipeds of length L lying in the range 15 m to 50 m and the width l of the receiver vat 1-1 lying in the range 0.5 m to 5 m. The second bottom wall 2b of the cup 1-2 is constituted by an inclined slope. The drain orifices 2d are situated on one side only of the second bottom wall 2b. Likewise, the skirt or bottom side wall 2c is situated on one side only of the second bottom wall 2b and beneath it, extending the second top side wall 2a. The annular lateral passage 5 is in the form of a longitudinal rectangular parallelepiped and is likewise situated on one side only of said second bottom wall 2b. The width of the annular lateral passage 5 lies in the range 3 cm to 10 cm. This elongate shape of the receiver vat 1-1 make it possible to have five of said first discharge pipes 1e for liquid 3 and three second top discharge pipes 1f for LNG 4. In this embodiment, the leakage liquid collector duct 1a forms a chute constituted by decking extending in the longitudinal direction YY' of the collector and separator device 1' of the invention, but it could equally well be constituted by a plurality of chutes or gutters arranged successively in parallel in the longitudinal direction YY'.

FIGS. 9A, 9B, and 9C show the application of a collector and separator device 1 of the invention to an FPSO type floating support 10.

In FIG. 9A, the FPSO type floating support 10 is anchored to the sea bottom 22 by anchor lines 22a. It receives natural gas extracted from wells in the sea bottom via production pipes 21 connecting the bottom to the surface. It includes transfer pipes 17, here shown offloading towards a ship of the methane tanker type, referred to herein as an offloading ship 20, and shown in a so-called "tandem" configuration. Said FPSO 10 possesses equipment 10b for processing and liquefying natural gas, and LNG storage tanks 12 for storing LNG incorporated within its hull. Said FPSO has a device 18 for storing and guiding said flexible transfer pipes 17.

In FIGS. 9A and 9B, the FPSO type floating support 10 has seven collector and separator devices 1, 1' of the invention, fastened on the sides 10c, 10c1, 10c2 to receive leakage liquids 3, 4 coming from the processor installation 10b resting on the deck 10a of the floating support. Each separator device of the invention 1, 1' comprises a said second storage tank 1-4 in the form of said cylindrical outer container of vertical axis and of horizontal cross-section that is square, that is reversibly fastened using reversible hooking means 4g on a first side 10c, 10c1, 10c2. Four separator devices of the invention 1, fastened on a first side 10c-1 are of the cylindrical type, as shown in FIGS. 1 to 7, whereas on the other side 10c2 there are two collector and separator devices 1' of the type shown in FIGS. 8A and 8B. On the side 10c-1, each device 1 pours LNG 4 into a single external container 1-4, as shown in FIG. 9C, whereas on the side 10c-2, a first collector and separator device 1' pours LNG 4 into to said second storage tanks 1-4, while the other longitudinal collector and separator device 1' of length l2 shorter than the length l1 of the other device 1', co-operates with a single external container 1-4.

More precisely, each of these seven collector and separator devices 1, 1' receives leakage liquid collected from decking elements 11, each collecting the leakage liquid coming from a portion of said installation 10b. In this example, the portion of the deck 10a supporting the liquefaction unit 10b is thus covered by a set of five decking elements 11 covering all of said portion of the surface of the deck that might receive leakage liquid coming from said liquefaction unit 10b, with three decking elements 11 pouring the liquid towards three devices 1 on the side 10c1 and two decking elements 11 pouring the liquid towards the devices 1' on the side 10c2. A sixth decking element 11 covers the rear portion of the surface of the deck 10a supporting the device 18 for storing and guiding the transfer pipe 17 arranged close to the stern wall 10d of the hull suitable for pouring the leakage liquid coming from the installation 10b towards the sides 10c1 fitted with a fourth separator device 1 and external container 1-4.

In FIGS. 9A and 9B, the support 10 has three of said LNG storage tanks 12 of substantially rectangular parallelepiped shape that are arranged side-by-side in succession in the longitudinal direction XX' and extending along the entire width of the floating support inside its hull.

In FIG. 9C, said external containers 1-4 present walls of steel fitted on their inside faces with a thermally insulating material so that said external containers may also be considered as cryogenic containers suitable for containing LNG in the liquid state at −165° C. while nevertheless having a much lower degree of insulation than the LNG storage tanks 12, so as to encourage the LNG to evaporate and nevertheless avoiding the structural elements of said external containers 1-4 reaching temperatures lower than a temperature in the range −20° C. to −40° C., so as to avoid any brittle fractures in said structural elements.

In FIG. 9C, the plane of the deck 10a is shown as being inclined with a downward slope from the horizontal middle axis of the support and of the deck towards the sides 10c, 10c-1, 10c-2 constituting the longitudinal side walls of the hull at an angle α1 of about 1°. The top wall or cover 4b in of the external container 1-4 is a little below the top ends of the sides 10c. The vertical cylindrical side walls 4a of the external containers 1-4 present respective side faces 4a-1, each facing a side 10c and having two hooks 4g arranged in a high portion and in a low portion and suitable for being suspended from parts presenting respective hollow shapes complementary to said hooks or "hinge pins", that are applied against the outside faces of said sides 10c in such a manner that said external containers 1-4 can be suspended therefrom and thus attached reversibly thereto. Collecting and transferring the leakage liquid from the processor installation 10b towards the inside of the external container 1-4 takes place with the help of a collector and separator device 1 with a collector duct 1a that is constituted by the end of a decking element 11. Each decking element 11 comprises a carrier structure made of steel or of duck board and covered in a layer of strong and insulating composite material, e.g. a sandwich made of CHARTEK®-INTERTHERM® 7050 from the supplier International (UK) of the AKZO-NOBEL group. The decking elements 11 are fastened on top of the deck 10a, being inclined at an angle α2 corresponding to a slope lying in the range 1% to 5%, and preferably the range 2% to 4% relative to the horizontal, sloping down from the end of the decking closest to the longitudinal middle axis towards the lowest end of the decking extending beyond the side 10c, i.e. towards the outside of the floating support 10.

In plan view, as shown in FIG. 9B, each decking element 11 is in the shape of a trapezoid with its side edges tapering towards the collector and separator device 1, 1' and/or a said collector duct 1a.

Once the leak(s) is/are under control, the external containers 1-4 are filled with LNG 4 to varying depths. It is then sought to empty them as quickly as possible, so as to return the entire installation to a maximum safety level. In a variant embodiment, second transfer means 8 are used that comprise a pump 4c serving to cause the LNG 4 to flow inside a second connection pipe 4d extending from close to the bottom 4f of the external container 1-4 up to and through the cover 4b and extending beyond that, e.g. towards and into the gas space of a said first LNG storage tank 12 inside the hull of the support 10.

In the embodiment of FIG. 9C, the external container 1-4 has a portion that always remains immersed, representing a fraction of the height of the external container 1-4 starting from its bottom 4f that lies in the range ¼ to ¾, and more particularly in the range ⅓ to ½ of the height of the external container 1-4 from its bottom 4f, i.e. below the sea surface 19. It can be understood that the immersed height H' varies as a function of the level of the waterline of the hull, which in turn varies depending on whether the tanks 12 are empty (waterline at about ¼ of the height of the container above its bottom wall 4f) or the tanks 12 are full of LNG 4 (waterline at about ¼ of the height of the container below its top wall 4b, or about ¾ above its bottom wall 4f). In this embodiment, buoyancy acts on the entire immersed volume of the container, and in addition the structure of said container must be capable of withstanding pressure, more particularly in its bottom portion. Thus, the attachment points need to withstand forces that are directed mainly downwards when the container is full of leakage liquid and when the FPSO is partially or completely empty, and to forces that are directed upwards when the container is empty and the FPSO is completely full.

The volume of each of said external containers 1-4 is determined as a function of the volumes of LNG applicable to the areas covered by the collector devices connected to said container. Consideration is thus taken of the following:

firstly the volumes of the vessels concerned (pipework, containers, pumps, . . . ) situated between the upstream and downstream valves; and secondly the production volume that is current during a period of time corresponding to the beginning of a leak incident and effective closure of all of the upstream and downstream valves involved, i.e. in general several minutes.

Thus, the volume of each of the containers is a function of its location relative to the installation, and may vary over a wide range, e.g. 50 m³ to 300 m³.

The description above relates to external containers 1-4 presenting respective covers on top through which there pass pipes 1f for delivering LNG, and also pipes for discharging gas; however, in a simplified version, said external containers 1-4 need not have covers. It is then essential, as soon as a leak occurs, to fill said container with foam so as to confine the LNG, with the LNG then evaporating directly to the open air through the thickness of said layer of foam.

Suitable foaming agents are foams of the firefighting type sold by the supplier ANGUS FIRE (UK).

In FIGS. 9A, 9B, and 9C, the settling tank 1-3 of FIG. 1 is not shown, however it may likewise be arranged against the side 10c, 10c1, 10c2, beside the external containers 1-4 extending the bottom ends of said first discharge pipes 1e at 1k.

The invention claimed is:

1. A device for collecting and separating liquids comprising (i) aqueous and/or oily liquids and (ii) cryogenic liquid, the device comprising:
   a) a first container comprising:
      a.1) a first bottom wall, having at least a first discharge pipe passing therethrough, said first discharge pipe extending over a height h above said first bottom wall and at a bottom end of said first discharge pipe opening into a first storage tank for storing aqueous and/or oily liquid;
      a.2) a first side wall; and
      a.3) a cover or roof covering a top end of said first container, said cover or roof having a first discharge orifice suitable for allowing a gas to be discharged;
   b) a second container contained inside said first container, said second container comprising:
      b.1) a second bottom wall, the second bottom wall being positioned above a top end of said first discharge pipe(s), said second bottom wall co-operating with said first bottom wall to define a bottom compartment of said first container, and
      b.2) a second top side wall, defining said second bottom wall and extending over said second bottom wall facing said first side wall, said second top side wall having at least one drain orifice in its base immediately above said second bottom wall, the drain orifice(s) communicating with a lateral passage, said lateral passage being defined on a side by said second top side wall and a bottom side wall of said second container and on an other side by said first side wall; and
      b.3) said second bottom side wall, extending under said second bottom wall facing said first side wall and extending to below the top end of said first discharge pipe(s);
   c) at least one liquid collector duct suitable for receiving the liquids comprising (i) aqueous and/or oily liquid and (ii) cryogenic liquid that are to be separated and for pouring said liquids into said second container, said liquid collector duct passing through said first side wall of said first container or through said cover or roof and/or opening out into said second container or into a top compartment of said first container above an open top end of said second container;
   d) at least one second discharge pipe opening at an end to a second storage tank outside said first container, said second discharge pipe passing through said first side wall of said first container or said cover or roof and/or an other end of said second discharge pipe opening into said first container above an open top end of said second container; and
   e) said first container being filled with water or with a water feed device, said water feed device being suitable for filling said first container with water in said lateral passage and in said bottom compartment of said first container under said second container up to a level above the top end of said first discharge pipe(s) and below said drain orifices of said second container.

2. The device according to claim 1, wherein
   a) said first container comprises:
      a.1) said first bottom wall having a first tubular discharge pipe passing therethrough, said first discharge pipe being a vertical central tube;
      a.2) said first side wall that is cylindrical and vertical; and
      a.3) said cover or roof covering the top end of said first container, said cover or roof having said first discharge orifice;
   b) said second container comprises:
      b.1) said second bottom wall that is sloping;
      b.2) a second top side wall that is vertical and cylindrical, and coaxial with said first side wall; and
      b.3) said second bottom side wall forming a peripheral lateral skirt that is cylindrical, vertical, and coaxial with said first side wall, extending under said second bottom wall around the top end of said first discharge pipe; and
   c) said lateral passage forming an annular passage, preferably of constant width, between said second top and bottom side walls and said first side wall of said first container.

3. The device according to claim 1, wherein said second bottom wall (2b) is supported by and secured to support structures standing on said first bottom wall, said support structures being in contact with water contained in said bottom compartment of said first container under said second container, and suitable for enabling heat to be transferred between the water contained in said first container and said second bottom wall.

4. The device according to claim 3, wherein said second bottom wall supports metal or steel plates in contact with the water contained in said first container under said second container, said metal or steel plates being suitable for transferring heat between the water contained in said first container and a liquid contained in said second container, said metal or steel plates not being in contact with said first bottom wall of said first container.

5. The device according to claim 1, wherein said first container comprises at least a first water feed orifice in said first side wall and/or said first bottom wall, opening into said first container below a bottom end of said second bottom side wall and said water feed device outside said first container, said water feed device being suitable for discharging said water via said first discharge pipe.

6. The device according to claim 5, wherein said first container further comprises a second water discharge orifice in said first side wall or first bottom wall below a bottom end of said second bottom side wall and said water feed device enabling continuously circulating water discharged via said second water discharge orifice in such a manner as to maintain a level of the water inside said first container below said drain orifices.

7. The device according to claim 1, wherein said first storage tank comprises a water-oil gravity separator device suitable for separating an oily phase and an aqueous phase and for discharging separately said oil phase and said aqueous phase.

8. The device according to claim 1, wherein said first side wall and said second top and bottom side walls and said first and second bottom walls are made of sheet metal or steel.

9. The device according to claim 2, wherein said first side wall and said second top and bottom side walls and said first discharge pipe are cylindrical and coaxial.

10. The device according to claim 1, wherein said first side wall has a rectangular parallelepiped shape having a length and a width and said second top side wall has a rectangular parallelepiped shape having a length the same as the length of the first side wall, and having a width smaller than the width of the first side wall, said first bottom wall having a plurality of said first discharge pipes passing therethrough, being arranged parallel to one another in succession in a longitudinal direction YY' of said first bottom wall, a top portion of said second top side wall including a plurality of said second discharge pipes, and said first and second containers are arranged relative to each other in such a manner that said lateral passage has a longitudinal rectangular parallelepiped shape, said drain orifices and said lateral passage extending along a single longitudinal edge of said second bottom wall.

11. A support installed at sea, grounded on the sea bottom or floating, including a processor installation, wherein the support comprises a device for collecting and separating (i) aqueous and/or oily liquid and (ii) cryogenic liquid according to claim 1.

12. The support according to claim 11, wherein said processor installation is located on a deck of said support, and at least one first LNG storage tank is incorporated within a hull of said support under said deck, and wherein said support includes at least one second cryogenic liquid storage tank situated outside said support and situated at least in part below the deck of said support on which said processor installation is located, said second storage tank being fastened against a side of said support, said deck comprising or supporting a first leakage liquid transfer means suitable for enabling liquid flowing from at least a portion of said installation to be transferred merely under gravity towards said liquid collector duct, said second discharge pipe opening at an other end into said second gas storage tank, said first leakage liquid transfer means comprising sloping decking that extends from under a portion at least of the processor installation to said liquid collector duct.

13. The support according to claim 12, wherein said second storage tank further comprises a pump and a second connection pipe suitable for transferring said cryogenic liquid contained in said second tank to said first tank within the hull of said support.

14. A method of separating liquids comprising (i) aqueous and/or oily liquids and/or (ii) a cryogenic liquid being a liquefied gas with a device for collecting and separating liquids according to claim 1, comprising the following successive steps:

1) collecting said liquid to be separated in said liquid collector duct and pouring the liquid into said second container, said first container being filled with water in said bottom compartment of said first container below said second container and up to a level above the top end of said first discharge pipe(s) and below said drain orifices of said second container;
2) discharging said liquid to be separated via said drain orifices towards said lateral passage; and
3) performing the following steps 3a) and 3b), wherein:
   3a) the aqueous and/or oily liquid is taken to said first discharge pipe, by putting into operation said water feed device for feeding and circulating water to accelerate the discharge of water via said first discharge pipe, said water feed device simultaneously maintaining a water level within said first container above the top end of said first discharge duct and below said drain orifices of said second container; and
   3b) the liquefied gas is causing a plug of ice to be created on making contact with the water in said lateral passage, or a layer of ice over the entire surface of the water within said first container, such that:
      3b.1) if the quantities and the flow rates of liquefied gas within said second container are such that the volume of liquefied gas does not overflow from said second container, said liquefied gas is regasified by lowering the temperature of the liquefied gas in contact with said second side and bottom walls of said second container and discharged via said first discharge orifice in said first container; and
      3b.2) if the quantities and the flow rate of liquefied gas within said second container are such that the volume of liquefied gas overflows from the second container and fills the top compartment of said first container at least in part, said liquefied gas is discharged via said second discharge pipe into said second storage tank.

15. The method according to claim 14, wherein said second storage tank is fastened against and outside a side of a support installed at sea and including a processor installation on a deck of said support, said deck comprising or supporting a first leakage liquid transfer means suitable for enabling liquid flowing from at least a portion of said installation to be transferred merely under gravity towards said liquid collector duct, said second discharge pipe opening at an other end into said second storage tank, and said first container is fed with water constituted by seawater at ambient temperature.

* * * * *